Feb. 10, 1959 W. M. BROBECK 2,873,376
ION PRODUCING MECHANISMS
Filed Feb. 21, 1946 5 Sheets-Sheet 5
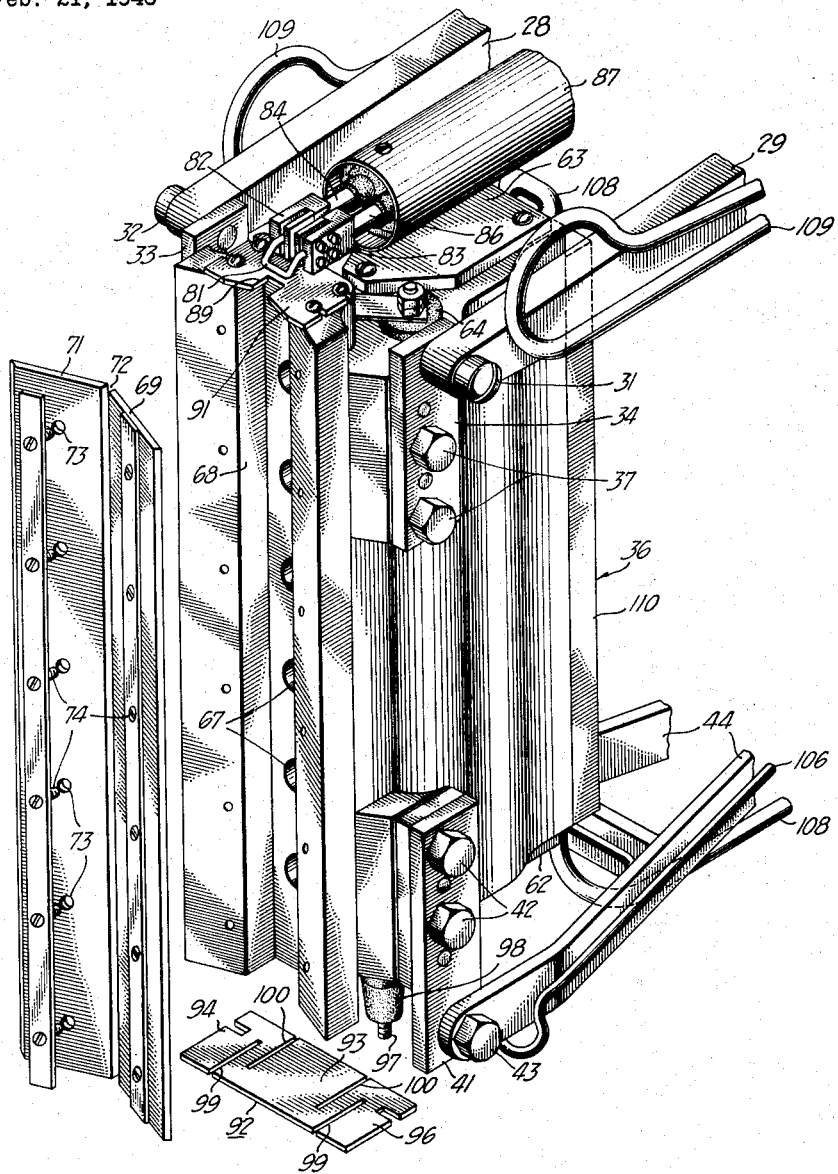
FIG_10_
INVENTOR.
William M. Brobeck
BY

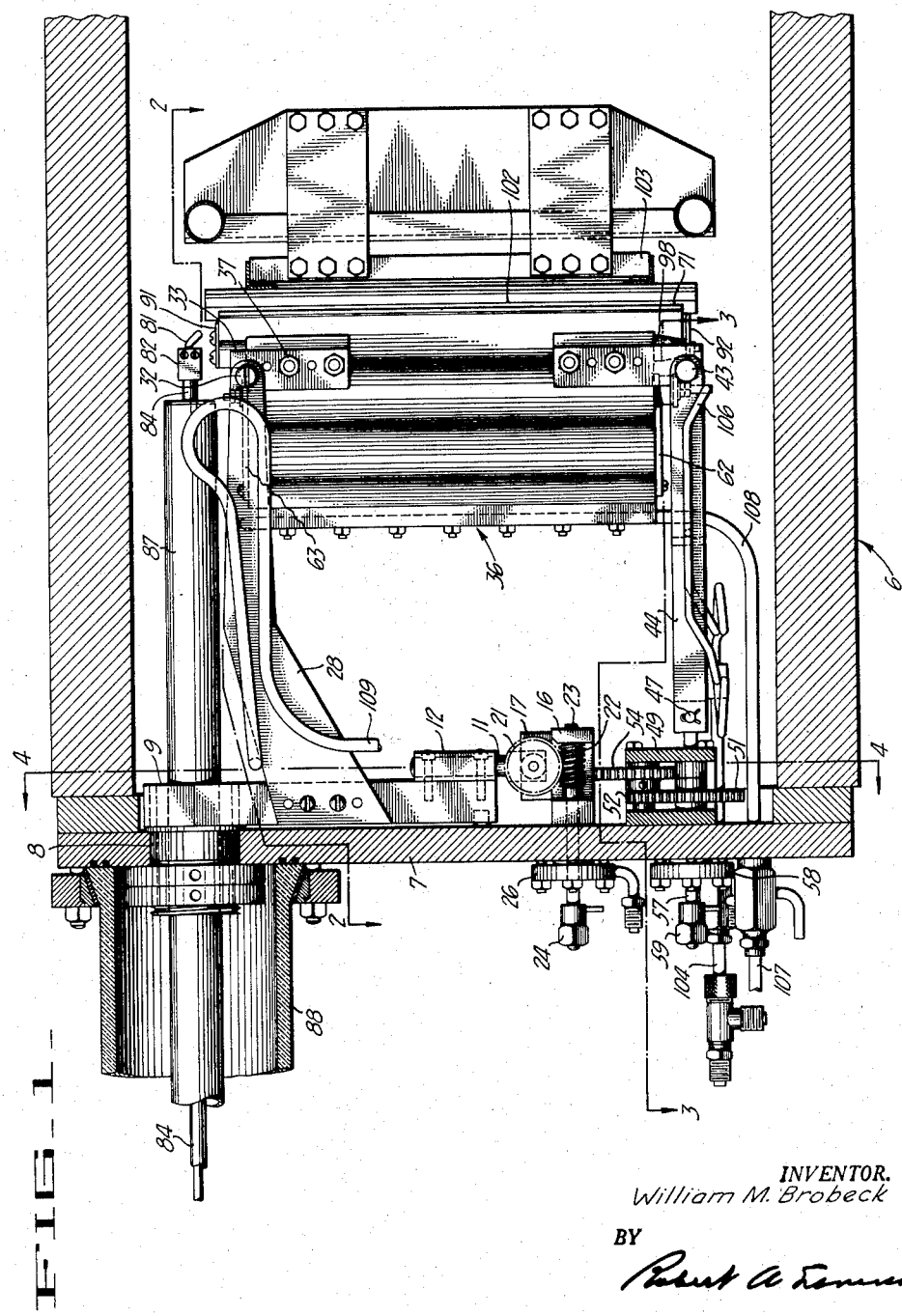

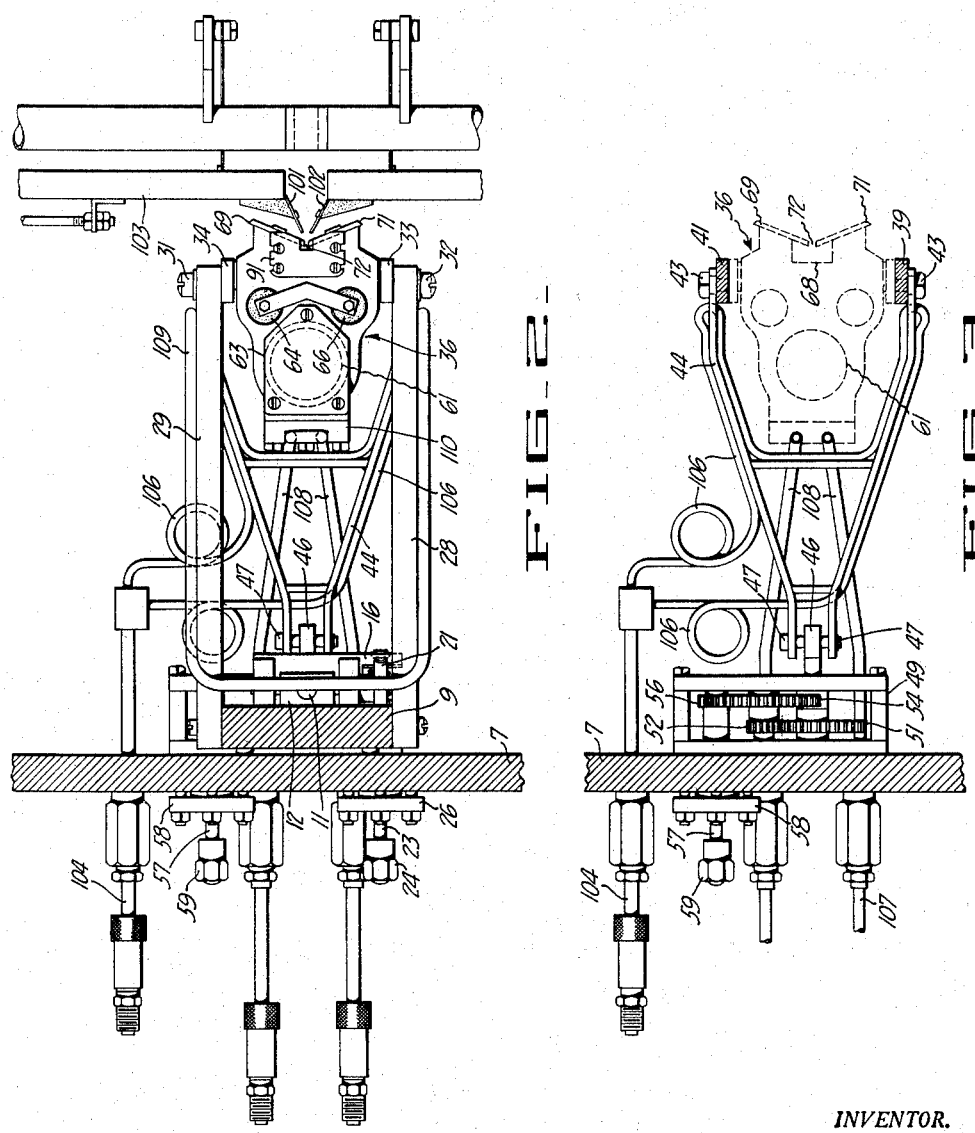

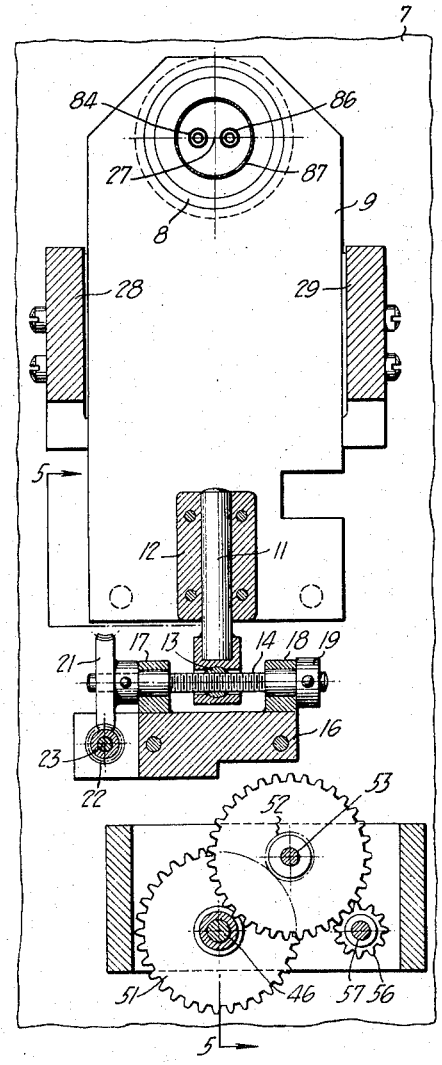
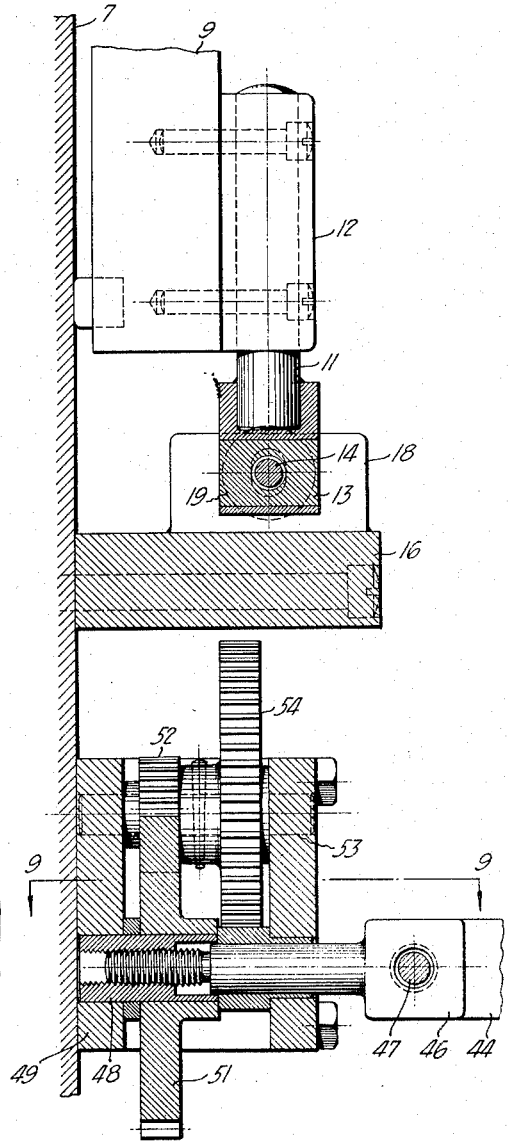
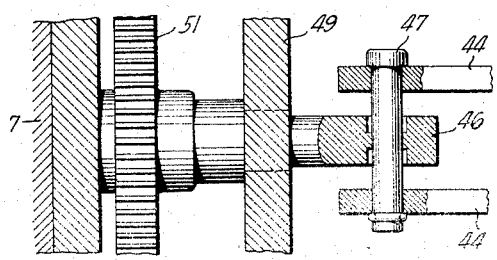
INVENTOR.
William M. Brobeck

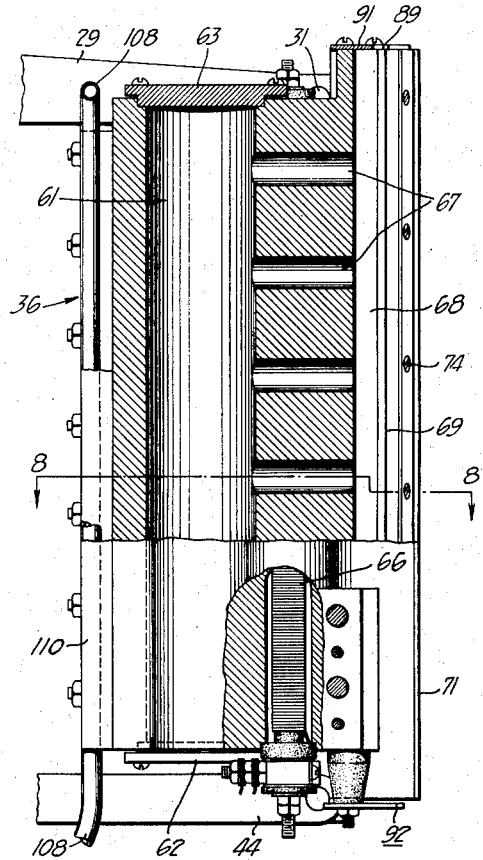
FIG_6_
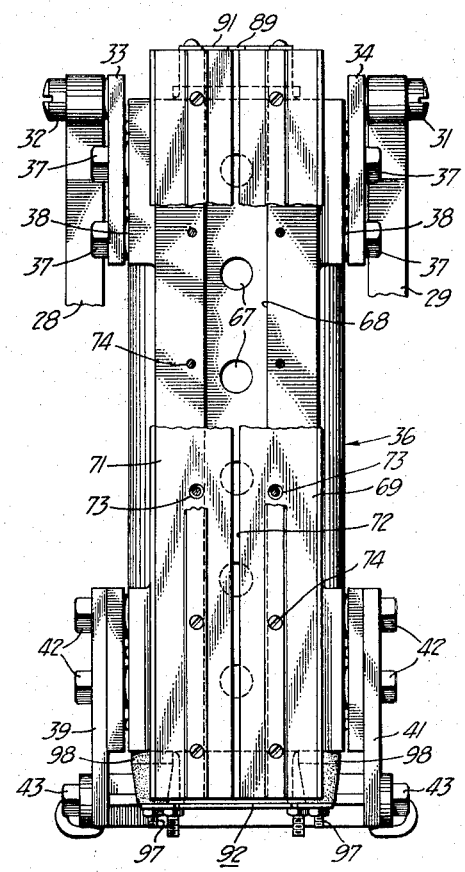
FIG_7_
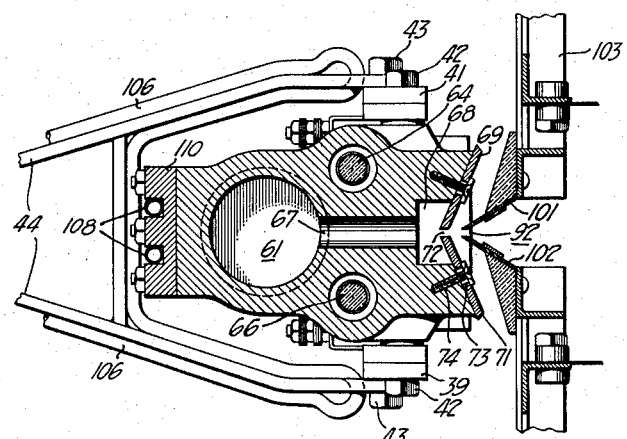
FIG_8_
INVENTOR.
William M. Brobeck
BY

United States Patent Office 2,873,376
Patented Feb. 10, 1959

2,873,376
ION PRODUCING MECHANISMS

William M. Brobeck, Berkeley, Calif., assignor to the United States of America as represented by the United States Atomic Energy Commission Application February 21, 1946, Serial No. 649,403

6 Claims. (Cl. 250—41.9)

The invention relates to ion generating means and particularly to means for producing ions of material for isotopic separation. It especially relates to a mechanism of the type referred to as a "calutron" and that is disclosed in considerable detail in U. S. Patent No. 2,709,222, which issued to Ernest O. Lawrence, on May 24, 1955. Several embodiments of a calutron are disclosed in the identified Lawrence patent and the present disclosure has to do primarily with improvements upon the particular embodiment of the calutron illustrated in Figures 24 to 50 of the Lawrence patent.

In the operation of a mechanism for providing ions on a copious scale, it has been determined that the supply of heat to the ionizing mechanism is a critical factor in establishing uniform and satisfactory protracted operation. The general adjustment of the source of ions within the ambient magnetic field as to its physical relationship to other elements or units of a calutron has likewise been determined to be a critical factor in the satisfactory operation of the mechanism. Furthermore, considerable wear due to erosion, bombardment, sparking and miscellaneous electrical phenomena occurring under vacuum conditions has presented itself as a barrier to prolonged satisfactory operation. It has also been determined that the stability and mechanical rigidity of the structure should be accorded more than the usual attention in order that a rugged device capable of operating for hours or days on end may be afforded.

It is, therefore, an object of the invention to overcome many or all of the difficulties referred to and to provide in general, an improved ion source mechanism for a calutron.

Another object of the invention is to provide means for reducing the difficulties due to sparking and random discharges in and about the source unit of the calutron.

A further object of the invention is to provide an ion source mechanism in which the heat distribution is such as to avoid local overheating and to maintain the temperature of the various critical localities of the unit at their optimum values.

Other objects as well as the foregoing, are attained in the embodiment of the invention described in the following description and illustrated in the accompanying drawings in which:

Figure 1 is a cross section on a vertical plane through the vacuum tank of a calutron showing the source unit of the invention in side elevation with certain minor portions being broken away and shown in cross section to disclose the interior arrangement;

Fig. 2 is a cross section, the planes of which are indicated by the lines 2—2 of Fig. 1;

Fig. 3 is a cross section, the planes of which are indicated by the lines 3—3 of Fig. 1;

Fig. 4 is a cross section, the plane of which is indicated by the line 4—4 of Fig. 1;

Fig. 5 is a cross section to an enlarged scale, the planes of which are indicated by the lines 5—5 of Fig. 4;

Fig. 6 is a side elevation of the source block and immediately adjacent mechanism, portions, however, being broken away to disclose the interior construction, and portions being in cross section on a vertical central plane;

Fig. 7 is a front elevation of the structure shown in Fig. 6, portions being broken away to disclose the nether parts;

Fig. 8 is a cross section, the planes of which are indicated by the lines 8—8 of Fig. 6;

Fig. 9 is a cross section, the plane of which is indicated by the line 9—9 of Fig. 5; and Fig. 10 is for the most part an isometric view of the source block and adjacent mechanism, portions, however, being in "exploded" position the better to disclose the mechanical construction.

The present embodiment of the invention is for use in a calutron mechanism of the type described in the above-identified Lawrence patent, and many of the parts of the present embodiment are identical with or interchangeable with comparably functioning parts of the disclosed Lawrence structure. The referred to patent is consequently relied upon by reference as a source of descriptive matter of the structure and functions that are not specifically included herein. Like the mentioned Lawrence patent, the present structure is designed to be utilized in a calutron tank 6 having a face plate 7 thereon. Pressed into the face plate 7 in an appropriate location is a sleeve 8 carrying a pendant plate 9 rotatably mounted thereon.

The plate 9 is equipped with an adjusting mechanism in the nature of a rod 11 slidably confined in a block 12 secured to the plate 9 and itself carrying a rotatable pin 13 engaged by a threaded bolt 14. A bracket 16 fastened on the face plate 7 is provided with journals 17 and 18 carrying the threaded bolt 14, the bolt being confined against axial translation by a collar 19 at one end and a gear wheel 21 at the other end. A worm 22 engages the gear wheel 21 and is mounted on a shaft 23 journaled in the bracket 16 and passing through the face plate 7 to an external actuating knob 24. A packing seal 26 maintains the vacuum-tight integrity of the tank 6.

When the knob 24 is rotated the connected mechanism is effective to rock the plate 9 about the axis 27 of the sleeve 8. The motion of the plate 9 is then transmitted to a pair of support arms 28 and 29, respectively, extending into the tank 6. At their innermost ends the support arms, carry journal pins 31 and 32 facing each other and engaged with apertured straps 33 and 34, respectively, disposed at the opposite sides of a source block 36, especially illustrated in Fig. 10. Preferably the straps 33 and 34 are connected to the block 36 by studs 37 with thermal insulating material such as collars 38 of nonconducting substance interposed therebetween to reduce heat transfer from the block 36. This mounting affords a connection for the block 36 on a transverse axis coincident with the axis of the studs 31 and 32 and at right angles to the axis 27.

In order that the block 36 can be appropriately positioned about the transverse axis, it is provided at its lower end with projecting straps 39 and 41 secured thereto by studs 42. The straps themselves are engaged by fasteners 43 passing through the pierced ends of a yoke 44, particularly as illustrated in Figs. 2, 3 and 8. The yoke is preferably fabricated of strap metal and is joined at its adjacent end to an operating rod 46 by a through pin 47. The operating rod, as especially shown in Fig. 5, is threaded at one end to engage a threaded sleeve 48 journaled in a mounting bracket 49 secured to the face plate 7.

In its turn, the sleeve 48 is fastened to and carries a spur gear 51 meshing with a pinion 52 on a stub shaft 53 carried by the face plate bracket 49. Also carried by the stub shaft 53 is a gear 54, in turn meshed with a pinion 56 fast on an adjusting shaft 57 extending through the face plate 7, with the customary vacuum seal 58, to a knob 59. Rotation of the knob 59 acts through the gear train to rotate the sleeve 48 and axially to advance or to retract the adjusting rod 46 through the yoke 44 and thus to rock the block 36.

The block 36 itself is preferably a single casting of metal with rather massive sections so that its heat transferring capabilities are considerable and so that the temperature of the block is maintained relatively uniform. Also the various exposed faces and intersections on the block, in so far as possible, are curved with generous radii in order that there be eliminated sharp corners and projections that induce sparking and discharge.

The block 36 is formed with a charge cavity or chamber 61 designed to receive a charge receptacle, not shown, of somewhat lesser diameter than the interior diameter of the chamber so that vapor or gas released from the charge container can substantially fill the chamber 61. This chamber extends throughout the entire length of the block 36 in a direction approximately that of the direction of the magnetic field within which the structure functions. The chamber 61 is closed at its bottom end by a cover plate 62 and at its upper end by a cover plate 63.

Vapor is evolved from the charge material within the chamber under the influence of heat supplied from a pair of electrically energized heating coils 64 and 66, respectively, disposed symmetrically on opposite sides of a longitudinal axis of the block 36 and surrounded with substantial quantities of metal for equalization of the conducted heat. Heat which is imparted to the block is in turn imparted to the charge recess, its temperature thereby being raised sufficiently high to cause vapor to evolve. There is thus supplied the material for subsequent ionization.

Since the chamber 61 during operation is substantially filled with vapor, it is provided with a series of passageways 67, cast in the block 36, and spaced substantially uniformly throughout the entire length of the cavity or chamber 61 to lead gas uniformly from the cavity past and between the heaters 64 and 66 and into an arc chamber or cavity 68. The arc chamber 68 is arranged with its principal dimensions substantially parallel to and coextensive with the charge chamber 61.

The block 36 does not entirely enclose, but only partially encloses the cavity 68, the closure being nearly completed by a pair of arc slit plates 69 and 71, respectively. Together, these form a re-entrant dihedral angle and are mounted on the forward dihedral faces of the block 36 with the plate edges nearly but not quite together in order to leave therebetween an arc slit 72. The plates 69 and 71 are pierced by enlarged apertures 73 through which fasteners 74 are passed in order that the arc slit plates can be individually adjusted on their block mounting. The plates 69 and 71 are preferably formed symmetrically about the fastening apertures 73 so that after the adjacent edges of a pair of plates have been utilized and have become eroded or worn, the plates may be detached, reversed and reinstalled thereby presenting fresh arc slit defining edges for continued satisfactory performance.

In order to ionize gaseous material passing from the charge chamber 61 through the ducts 67 and into the arc chamber 68, there is provided means for striking an ionizing arc, including an electron emitting filamentary cathode 81. This is a removable wire secured by caps 82 and 83 disposed at the inner terminals of water-cooled conductors 84 and 86, mounted in a cathode stem 87. The stem is principally fabricated by a tube disposed coaxially with the axis 27, passing through the sleeve 8 and extending through a mounting insulator 88 and a vacuum seal, not shown, to a suitable location for inclusion in a cathode supply circuit.

The filament 81 is located immediately above, in the direction of the magnetic field, a notch or slot 89 formed in the forward edge of a plate 91 secured to the top of the block 36 and effective in a large measure to preclude return bombardment of the wire 81 by particles from the arc or its vicinity. In alignment, in the direction of the magnetic field, with the filament 81 but disposed at the opposite end of the arc block 36, is an anode plate 92. This is sometimes referred to as an electron intercepter and conveniently is fabricated of a sheet of metal having a substantially uninterrupted portion 93 and having fastening portions 94 and 96, respectively, designed for the reception of fasteners 97 projecting from insulators 98 secured to the block 36.

Since the interception of electrons by the central portion 93 results in considerable heating of the anode plate and since it is desired to avoid overheating of the fastenings 97, the anode plate 92 is preferably interrupted between the central portion 93 and the fastening portions 94 and 96 by a plurality of slots or cuts 99 and 100, for example, constituting heat dams or barriers and effective substantially to reduce the transmission of heat to the fastenings. Since the anode plate 92 is preferably connected by a suitable electrical conductor, not shown, in an arc discharge circuit with the filamentary cathode 81, when the circuit is energized an ionizing arc is struck from the cathode to the anode extending through the arc chamber 68 and is effective largely to ionize gaseous particles passing therethrough.

Substantially in the same fashion as disclosed in the above-identified Lawrence patent and in order to withdraw formed ions from the vicinity of the arc, there is provided a pair of accelerator electrodes 101 and 102 mounted on an accelerator frame 103 suitably supported within the tank 6 and maintained at an accelerating potential with respect to the arc block 36. The effect of the accelerating electrodes 101 and 102 is to withdraw ions from the entire length of the ionizing arc and to dispatch the withdrawn ions in the form of a ribbon-like ion beam from the ion source into the calutron tank 6 for further processing. The structure as described is effective to produce ions in copious quantities during protracted operation with a reduced amount of sparking and random discharge, with a long-lived anode and with generally improved operating characteristics.

Further to assist in such operation, the source unit is provided with suitable cooling means for use in reducing its temperature quickly at the end of a run. Deleterious gases either will not form or will be present for only a short time, inasmuch as the temperature of the source is reduced quickly to a safe value for manual handling. A lead 107 extends to a circuit 108 confined in a detachable block 110 at the rear of the source block 36 and is especially effective immediately to withdraw heat from such block in the vicinity of the charge chamber 61. Additionally, suitable cooling tubes 109 are provided on the support arms 28 and 29 so that the support mechanism can be continuously cooled during operation. Similarly, there are provided cooling water leads such as 104, affording a circuit 106 thermally joined to the adjusting yoke 44.

In accordance with the invention there is provided a structure for supplying ions in copious quantities in a uniform fashion over a protracted time and in a way which results in general improvement in calutron structure and operation.

What is claimed is:

1. In a calutron, an ion generator comprising a single block of metal having a reservoir and an arc chamber therein with intercommunicating passages therebetween, and a heater in said block disposed approximately equidistant from said reservoir and said arc chamber.

2. In a calutron, an ion generator comprising a single block of metal having a reservoir formed therein, an arc chamber formed therein, passages formed therein for establishing communication between the arc chamber and the reservoir, and heater cavities formed therein on either side of the passages and approximately equidistant from the reservoir and the arc chamber 3. In a calutron, an ion generator comprising a block of metal having a reservoir and an arc chamber therein that are generally parallel to each other, said block having a plurality of passages establishing communication between the reservoir and the chamber throughout their co-extensive length, means for heating the block, and means thermally united with the block adjacent the reservoir for cooling the block.

4. In a calutron, an ion generator comprising a block having an elongated recess in one face thereof partially forming an arc chamber, strips of material disposed on either side of the recess further to enclose the recess and to define an exit slit therefrom, each strip having substantially parallel sides adapted to define the slit boundary in accordance with the adjustable mounting of the strip, and means for securing said strips centrally between said parallel sides thereof and substantially symmetrically at either side of the recess whereby the strips may be reversed to use the opposite sides thereof to define the exit opening.

5. In a calutron, an ion generator comprising the combination of a block having an elongated recess therein, an electron emitter disposed at one end of the recess, an electron interceptor attached to said block at the opposite end of the recess, said interceptor comprising a substantially flat plate mounted in a plane substantially perpendicular to the path of travel of electrons and an electric circuit for projecting electrons from the emitter through the recess toward the interceptor the combination being characterized by the configuration of the interceptor wherein the points of attachment of the interceptor to the block are separated from the body of the interceptor by parallel slits extending inwardly from opposite sides of the interceptor and past each other to obtain a low heat transfer from the body of the interceptor to the points of attachment to the block.

6. In a calutron, an ion generator comprising a single block of metal defining a reservoir, an arc chamber and passages establishing communication between said reservoir and said chamber, and heaters within said block located adjacent said passages and between said cavity and said chamber.

References Cited in the file of this patent

UNITED STATES PATENTS

| | | |
|---|---|---|
| 1,038,910 | Von Lieben | Sept. 17, 1912 |
| 1,581,520 | Schwerin | Apr. 20, 1926 |
| 1,726,365 | Pirani | Aug. 27, 1929 |
| 2,221,467 | Bleakney | Nov. 12, 1940 |
| 2,378,962 | Washburn | June 26, 1945 |